March 31, 1942.    J. M. POCHE    2,278,215
COMBINED LAND AND MARINE VEHICLE
Filed Oct. 17, 1939    2 Sheets-Sheet 1
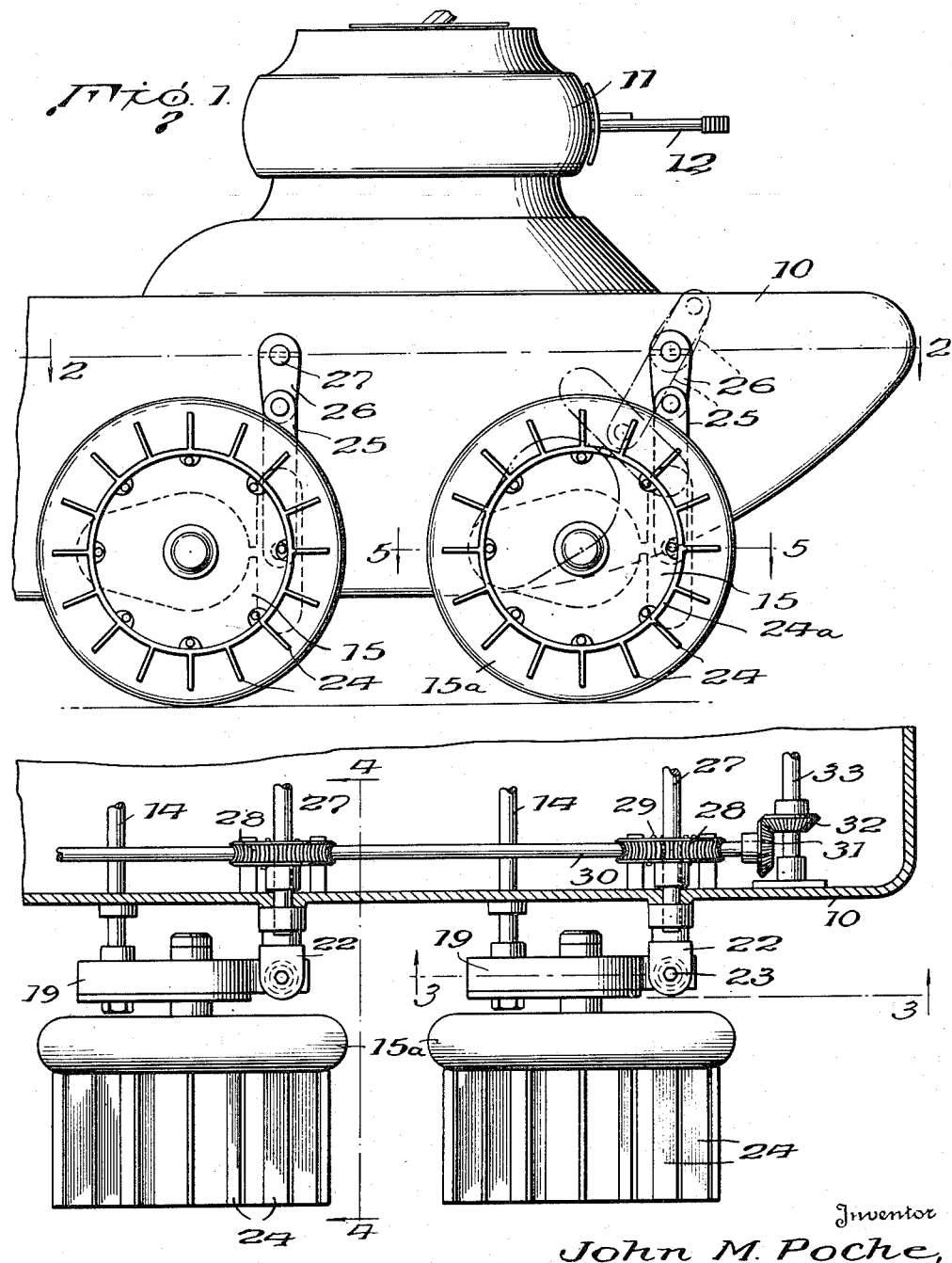
Inventor
John M. Poche,
By Church & Church
His Attorneys

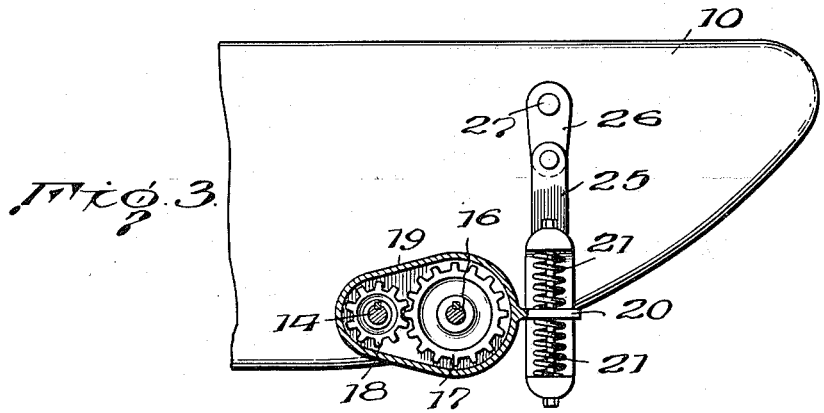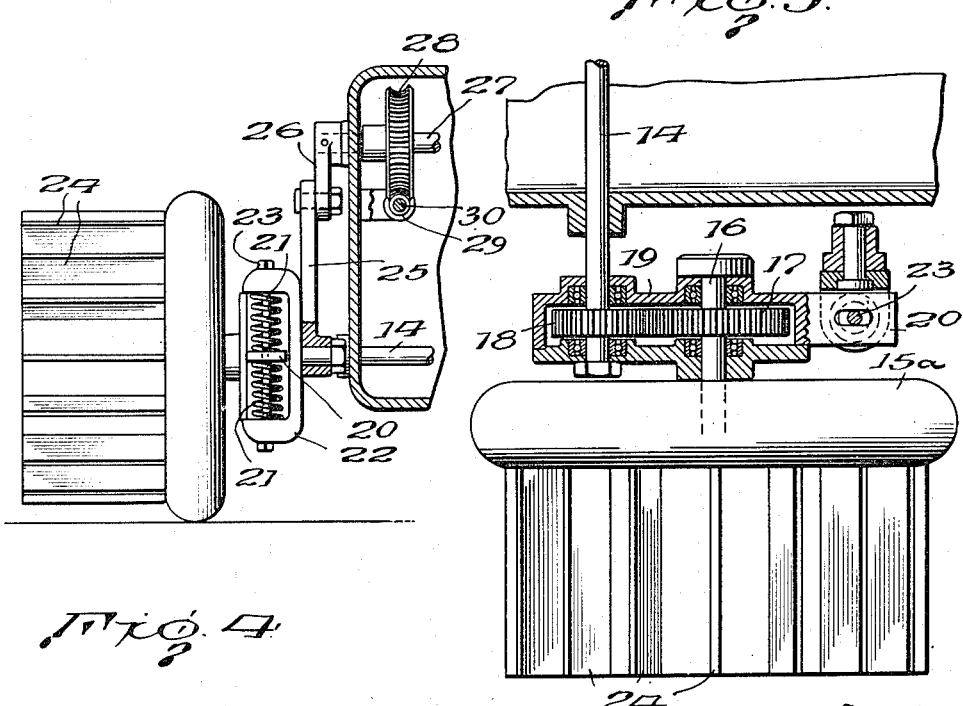

Patented Mar. 31, 1942

2,278,215

UNITED STATES PATENT OFFICE 2,278,215

COMBINED LAND AND MARINE VEHICLE

John Morris Poche, Gulfport, Miss., assignor of one-half to Lucas Vaccaro, New Orleans, La.

Application October 17, 1939, Serial No. 299,897

4 Claims. (Cl. 115—1)

This invention relates to improvements in combined land and marine vehicles and, particularly, to the propelling mechanism for such vehicles.

The primary object is to provide a propulsion mechanism which can be operated with maximum efficiency when the vehicle is traveling on either land or water.

It has heretofore been proposed to provide the ground wheels of combined land and marine vehicles with members which may serve as paddle blades or propeller blades, whereby the vehicle can be propelled through a body of water. In use, however, the propelling effect of those particular blades which are actually exerting a forward driving effort in the water, in many of these prior constructions, is offset, at least to a limited extent, by certain of the remaining blades being partially submerged and exerting a reverse or backward driving effort so that the propelling mechanism, as a whole, cannot operate at maximum efficiency. In other words, with the wheel submerged to a point where the blades above the center of rotation are also submerged, these upper blades tend to drive the vehicle backward. The present invention seeks to overcome this difficulty and increase the efficiency of the propelling mechanism in the water by providing vertically adjustable wheels whereby the wheels may be elevated relatively to the vehicle body to raise them to a point where the propeller blades above the center of rotation will be above the water line when the vehicle is used for marine purposes.

More specifically, the invention contemplates a propelling mechanism for combined land and marine vehicles wherein the ground wheels provided with propeller blades are carried on axles driven from shafts fixed vertically with respect to the vehicle body, but with the wheels and their axles adjustable vertically with respect to the body and shafts.

A still further object is to form the members, which are to serve as propelling blades, of sturdy construction, so as to aid in increasing the tractive effort of the wheels when the vehicle is traveling on marshy or similar terrain.

With these and other objects in view, the invention consists in certain details of construction and combinations and arrangements of parts, all as will hereinafter be more fully described and the novel features thereof particularly pointed out in the appended claims.

In the accompanying drawings—

Figure 1 is a side elevational view of the front portion of a vehicle provided with adjustable propelling wheels in accordance with the present invention;

Fig. 2 is a transverse horizontal section on the line 2—2 of Fig. 1;

Fig. 3 is a vertical longitudinal sectional view on the line 3—3 of Fig. 2;

Fig. 4 is a transverse vertical sectional view on the line 4—4 of Fig. 2; and

Fig. 5 is a horizontal sectional view on the line 5—5 of Fig. 1.

The present invention is capable of use in conjunction with vehicle bodies of various types but, for purposes of illustration, there is shown a so-called tank body 10 having a turret 11 for ordnance 12 such as is used in vehicles of this particular type. Extending through the side walls of the tank are shafts 14, one for each wheel 15. These shafts 14 are driven from a source of power through suitable driving connections, but as these elements do not actually form any part of the present invention they are neither shown nor described herein.

Each wheel 15 has an axle 16 which is driven from its shaft 14, gears 17, 18, on the axle and shaft, respectively, constituting this driving connection. The axle is journaled in a housing 19 for the driving gears and said housing is, in turn, journaled on the shaft 14 so that it is free to rock in a vertical plane. The gear housing 19 is preferably formed with an extension 20 positioned between springs 21 which are retained in a casing 22 by a retaining pin or bolt 23. The springs engage against the bottom and top faces of extension 20 and, with the casing 22 held stationary, yieldingly resist rocking motion of the gear housing so as to absorb shocks imposed on the wheels and housing when the former encounter irregularities in a roadway.

Each wheel is provided with means for propelling the vehicle in water, preferably in the form of a plurality of propeller or paddle blades 24. In order to raise the wheel, when the vehicle enters a body of water, to a position where blades above the horizontal plane of the axle will be above the water line, means are provided for elevating the housing 19 and retaining it in such elevated position. Preferably, each spring casing 22 is pivotally mounted on a link 25 which, in turn, is pivoted to a crank or arm 26 rigid on a shaft 27. Thus, by rotating shaft 27 to rock arm 26, the position of the spring casing, and consequently the housing 19, together with the axle and wheel journaled therein, can be varied as desired. For instance, assuming the several parts to be normally positioned as shown at the right of Fig. 1, for land travel. If the vehicle enters a body of water and the wheels become submerged to a point where the blades 24, as they pass above the horizontal plane of axle 16, are also submerged, the wheel can be raised by turning shaft 27 to move crank arm 26 to the position shown in dotted lines. Thus the spring casing and gear housing will be elevated correspondingly. Any suitable actuating mechanism can be utilized for rotating the several shafts 27. For instance, they may be provided, adjacent the side walls of the vehicle, with worm wheels 28 cooperating with worms 29 on shafts 30 extending longitudinally of the vehicle. Shafts 30 may further have gears 31 mounted thereon in mesh with gears 32 on a transverse master shaft 33 which can be power-actuated if desired. In this way, the several wheels can be adjusted simultaneously in a single operation. The steering of the vehicle may be accomplished by varying the operating speeds of the wheels at opposite sides of the vehicle, as is well understood in connection with the ordinary tank and tractor constructions.

The members 24 are of sturdy construction, preferably made of metal radiating from a cylinder or ring 24ᵃ with their outer extremities located rather close to, but radially within the periphery of the wheel. With this construction and arrangement, said members materially increase the traction of the wheels when the vehicle is traveling on soft terrain where the ordinary vehicle would bog down and become mired. Preferably, the wheels are provided with pneumatic tires for traveling at high speeds over suitable terrain.

While a fighting tank has been illustrated in the present instance, it will be appreciated that the invention is not limited to any particular type of vehicle, but is equally applicable to various types, including the so-called troop car. The vehicle will, of course, be made as light as possible under the controlling circumstances and, regardless of its type and construction, it will possess the proper degree of buoyancy so as to be capable of use as a marine vehicle. In this connection, the cylindrical members 24ᵃ of the wheels may be closed at their outer ends to form water-tight compartments which will increase the buoyancy of the vehicle.

What I claim is:

1. In a combined land and marine vehicle, a vehicle body, a driving shaft projecting from said body, an axle support journaled on said shaft, an axle journaled in said support, springs yieldingly sustaining said support, a housing for said springs, means pivotally attached to said spring housing for altering the position of said housing and axle vertically of the vehicle body, said housing being pivotally mounted to swing in an arcuate path about said driving shaft, means for transmitting rotary motion from said shaft to said axle, a wheel on said axle, and means carried by said wheel for propelling the vehicle when the latter is used for marine purposes.

2. In a combined land and marine vehicle, a vehicle body, a driving shaft, a gear casing journaled on said shaft, an axle journaled in said casing, intermeshing gears on said shaft and axle within said casing, an extension on said casing, springs disposed against opposite surfaces of said extension, a carrier for said springs, means pivotally attached to said carrier for raising and lowering the same together with said axle, said carrier being pivotally mounted to swing in an arcuate path about said driving shaft, a ground wheel on the axle, and means on said wheel for propelling the vehicle in water.

3. In a combined land and marine vehicle, a vehicle body, a driving shaft, an axle support journaled on the shaft, an axle journaled in said support, a ground wheel on said axle, propeller blades on said wheel, means for transmitting rotary motion from the shaft to the axle, springs yieldingly resisting rocking of the axle support on the shaft, a carrier for said springs, and a crank journaled in the vehicle body, said crank having an arm attached to said spring carrier for raising and lowering the same together with said axle.

4. In a combined land and marine vehicle, a vehicle body, a driving shaft projecting from said body, an axle support journaled on said shaft, an axle journaled in said support, means yieldingly sustaining said support, a housing for said sustaining means, said housing being pivotally mounted to swing in an arcuate path about said driving shaft, means pivotally attached to said housing for altering the position of the housing and axle vertically of the vehicle body, means for transmitting rotary motion from said shaft to the axle, a wheel on said axle, and means carried by said wheel for propelling the vehicle when the latter is used for marine purposes.

JOHN MORRIS POCHE.